US012172762B2

United States Patent
Spitzer

(10) Patent No.: US 12,172,762 B2
(45) Date of Patent: Dec. 24, 2024

(54) PARALLEL HYBRID PROPULSION SYSTEM

(71) Applicant: Ampaire, Inc., Hawthorne, CA (US)

(72) Inventor: Jeffrey Spitzer, San Diego, CA (US)

(73) Assignee: Ampaire, Inc., Hawthorne, CA (US)

( * ) Notice: Subject to any disclaimer, the term of this patent is extended or adjusted under 35 U.S.C. 154(b) by 24 days.

(21) Appl. No.: 18/200,810

(22) Filed: May 23, 2023

(65) Prior Publication Data

US 2024/0059419 A1 Feb. 22, 2024

Related U.S. Application Data

(63) Continuation of application No. 17/891,534, filed on Aug. 19, 2022, now Pat. No. 11,685,537.

(51) Int. Cl.
| | |
|---|---|
| *B64D 27/33* | (2024.01) |
| *B64D 27/08* | (2006.01) |
| *B64D 27/24* | (2006.01) |
| *B64D 35/025* | (2024.01) |
| *B64D 35/08* | (2006.01) |

(52) U.S. Cl.
CPC ............ *B64D 27/24* (2013.01); *B64D 27/08* (2013.01); *B64D 27/33* (2024.01); *B64D 35/025* (2024.01); *B64D 35/08* (2013.01)

(58) Field of Classification Search
CPC ..... B64D 27/33; B64D 35/023; B64D 35/025
See application file for complete search history.

(56) References Cited

U.S. PATENT DOCUMENTS

| | | |
|---|---|---|
| 3,420,057 A | 1/1969 | Barlow |
| 2012/0209456 A1 | 2/2012 | Takatori et al. |
| 2017/0320584 A1 | 11/2017 | Menheere |
| 2018/0194483 A1 | 7/2018 | Schwoller |
| 2019/0002113 A1 | 1/2019 | Gansler et al. |
| 2019/0047720 A1 | 2/2019 | Bosma et al. |
| 2022/0111960 A1 | 4/2022 | Tran |
| 2022/0144439 A1 | 5/2022 | Roberts |

FOREIGN PATENT DOCUMENTS

CN 105909377 A 8/2016

OTHER PUBLICATIONS

Search Report for European Application No. 23192259.2, mailed on Feb. 22, 2024, 9 pages.

*Primary Examiner* — Nicholas McFall

(57) ABSTRACT

Systems and methods for controlling flight via a parallel hybrid aircraft having an electric propulsion system and a combustion propulsion system are disclosed. Exemplary implementations may include: a combustion propulsion system including a combustion engine; an electric propulsion system including a motor and an electric power source, wherein the motor comprises a stator, a rotor coupled to the engine shaft, and support bearings between the rotor and the stator; a mechanical link coupled to the stator and the combustion engine, wherein the mechanical link substantially prevents movement of the stator in a rotational degree of freedom; and a propeller coupled to the engine shaft, wherein the rotor is coupled to the engine shaft between the propeller and the combustion engine.

20 Claims, 10 Drawing Sheets

PARALLEL HYBRID PROPULSION SYSTEM

The present application is a continuation of U.S. application Ser. No. 17/891,534, filed on Aug. 19, 2022, entitled "PARALLEL HYBRID PROPULSION SYSTEM", the disclosure thereof is incorporated by reference in its entirety.

FIELD

The disclosure relates to a parallel hybrid propulsion system.

BACKGROUND

Electric aircraft have several significant advantages over typical combustion powered aircraft. For example, the emissions and noise pollution of combustion powered aircraft are some of the significant problems solved by electric aircraft. However, existing electric aircraft are typically restricted by heavy battery requirements.

Existing hybrid aircrafts often use both combustion and electric power in series to drive the same propulsion system. These existing hybrid aircraft suffer from efficiency losses in energy conversion.

Existing hybrid propulsion systems may use complex systems, including gears, belts, and direct drive elements, to couple the combustion engine with the electric motor. These existing systems require accurate alignment of the combustion engine shaft and the electric motor shaft and additional mounting components to mount the electric motor nearby the combustion engine, which adds unnecessary weight and complexity.

SUMMARY

Implementations of the disclosure are directed to systems and methods for controlling flight of a parallel hybrid aircraft. In one implementation, a parallel hybrid propulsion system for an aircraft is disclosed. The parallel hybrid propulsion system may include a combustion propulsion system including a combustion engine. The combustion engine may include an engine shaft. The parallel hybrid propulsion system may include an electric propulsion system including a motor and an electric power source. The motor may include a stator, a rotor coupled to the engine shaft, and support bearings between the rotor and the stator. The parallel hybrid propulsion system may include a mechanical link coupled to the stator and the combustion engine. The mechanical link may substantially prevent movement of the stator in a rotational degree of freedom. The parallel hybrid propulsion system may include a propeller coupled to the engine shaft. The rotor may be coupled to the engine shaft between the propeller and the combustion engine.

In implementations, the mechanical link may be coupled to each of the stator and the combustion engine via a spherical bearing.

In implementations, the mechanical link may be at an angle of less than 30 degrees with respect to an axis of the engine shaft.

In implementations, the combustion engine may include a gear box, wherein the gearbox comprises the engine shaft.

In implementations, the rotational degree of freedom may be a rotation of the rotor with respect to the stator.

In implementations, the mechanical link may allow movement of the stator relative to the combustion engine in other degrees of freedom.

In implementations, the parallel hybrid propulsion system may further include a flight control system that controls which of the electric propulsion system and/or the combustion propulsion system provides propulsion and/or thrust. The flight control system may be configured to control the electric propulsion system to provide propulsion and/or thrust to propel the parallel hybrid aircraft while the combustion propulsion system is idle. The flight control system may be configured to control both the electric propulsion system and the combustion propulsion system to provide propulsion and/or thrust. The flight control system may be configured to control the combustion propulsion system to provide propulsion and/or thrust, while the electric propulsion system is in a low-power mode.

In implementations, the combustion propulsion system may include a compressor, a turbine, a diesel engine, a piston engine, a ducted fan, a combustor, a mixer, and/or a nozzle.

In another implementation, a method for controlling flight via a parallel hybrid aircraft having an electric propulsion system and a combustion propulsion system is disclosed. The method may include initiating the electric propulsion system, which is independently operable from the combustion propulsion system and which includes a motor and an electric power source. The motor may include a stator, a rotor, and a shaft. The method may include initiating the combustion propulsion system, which is independently operable from the electric propulsion system and which includes a combustion engine. The method may include driving a propeller via the engine shaft. The engine shaft may be coupled to the shaft. A mechanical link may be coupled to the stator and the combustion engine. The method may include controlling both the electric propulsion system and the combustion propulsion system, which are independently operable, to provide propulsion and/or thrust.

In implementations, the mechanical link may allow movement in a rotational degree of freedom.

In implementations, the rotation degree of freedom may be a rotation of the rotor with respect to the stator.

In implementations, the mechanical link may allow movement of the stator in other degrees of freedom.

In implementations, the mechanical link may be coupled to each of the stator and the combustion engine via an elastomeric bearing.

In implementations, the mechanical link may be at an angle of less than 30 degrees with respect to the shaft.

In implementations, the combustion engine may include a gear box, wherein the gearbox comprises the engine shaft.

In implementations, the combustion propulsion system may include a compressor, a turbine, a diesel engine, a piston engine, a ducted fan, a combustor, a mixer, and/or a nozzle.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Existing parallel hybrid aircraft with a combustion engine and an electric motor typically have a rotating shaft as the power output elements. Existing solutions require both output shafts to be connected to the power consuming element (notionally a propeller) which is mounted on one of the shafts or on an independent shaft. These existing solutions add unnecessary weight through motor mounting components and output shaft connecting components. Further, the existing solutions unnecessarily complicate the design by requiring systems to connect the output shafts to the power consuming element and systems to accommodate misalignment between the two output shafts. Moreover, when coupling two shafts together that are supported on separate bearing systems, perfect alignment can never be obtained or maintained. In other words, with a combustion engine (i.e., piston engine) that has a rotating crankshaft, perfectly aligning the combustion engine output shaft with the electric motor output shaft is not possible. As such, existing methods typically include heavy, complex setups for misalignment. Existing examples include a belt drive system, which does not require perfect alignment, or a shaft coupling solution, which allows some shaft misalignment while transmitting the desirable shaft rotation torque. However, these existing solutions add unnecessary weight and package volume.

In general, a motor may include a rotor and a stator. The rotor is the motor's main moving part. The rotation of the rotor creates torque that can be output through a rotor shaft. The stator may create a magnetic field to drive the motor. The rotor and stator may interact through conductors that generate magnetic force to rotate the rotor. In addition, there may be some system to keep the rotor and stator positioned relative to one another. As an example, rotational bearings may be used between the two. In implementations, the motor may have a shaft connected to the rotor. In other implementations, the motor does not have a shaft connected to the rotor.

Figure 7:
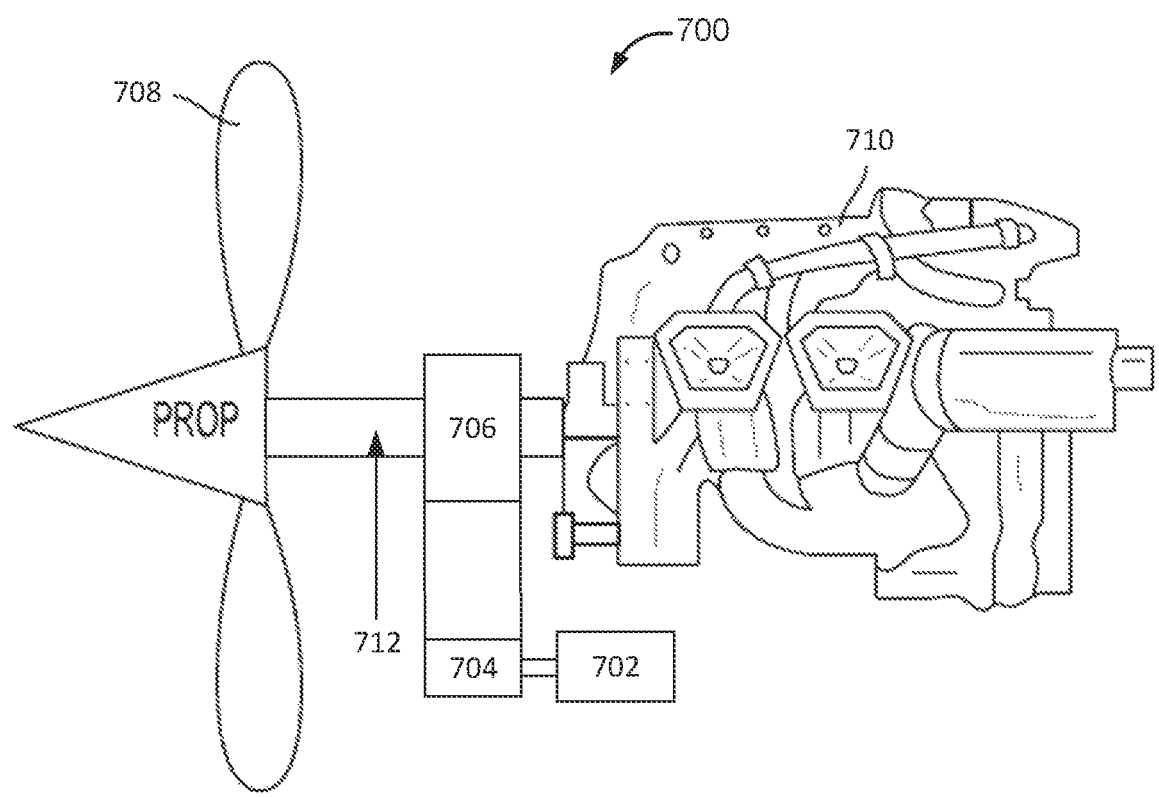
FIG. 7 illustrates a belt, chain, or gearbox hybrid system.
Figure 8:
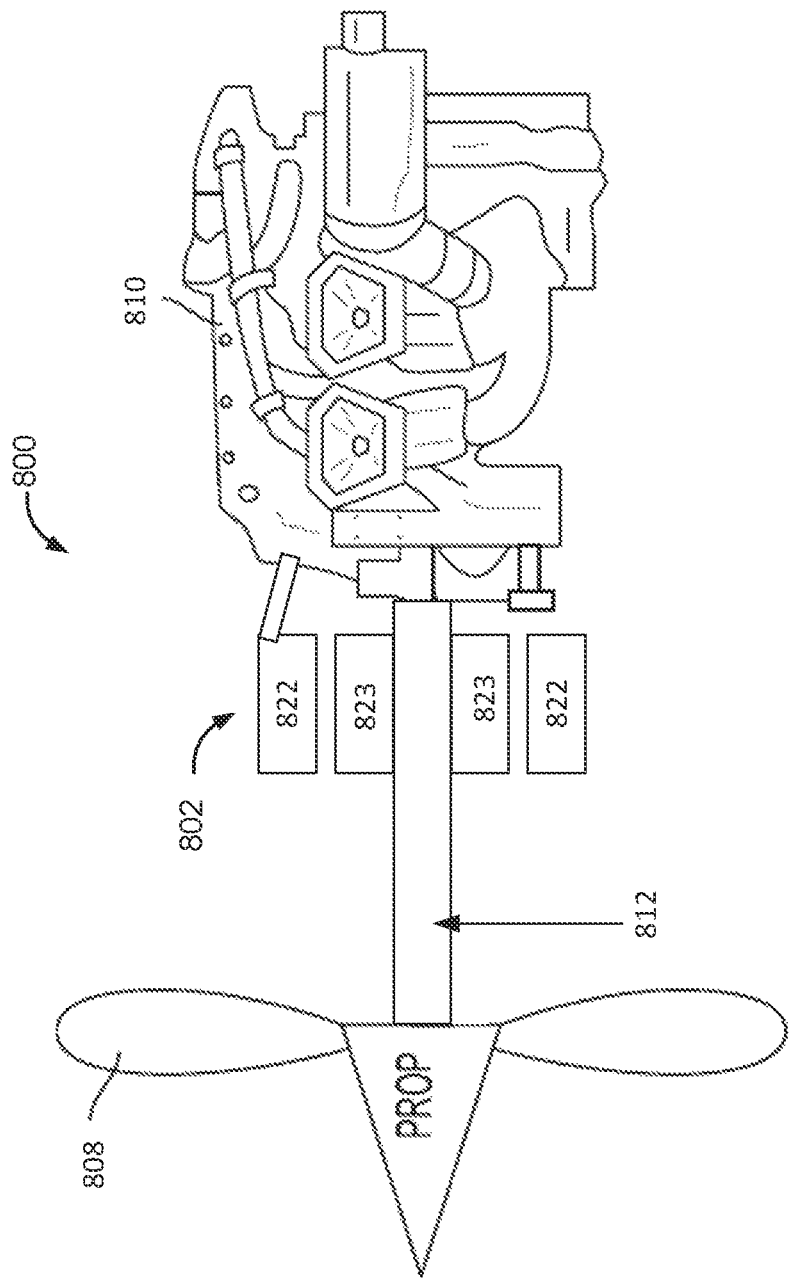
FIG. 8 illustrates a bearingless system.
Figure 9:
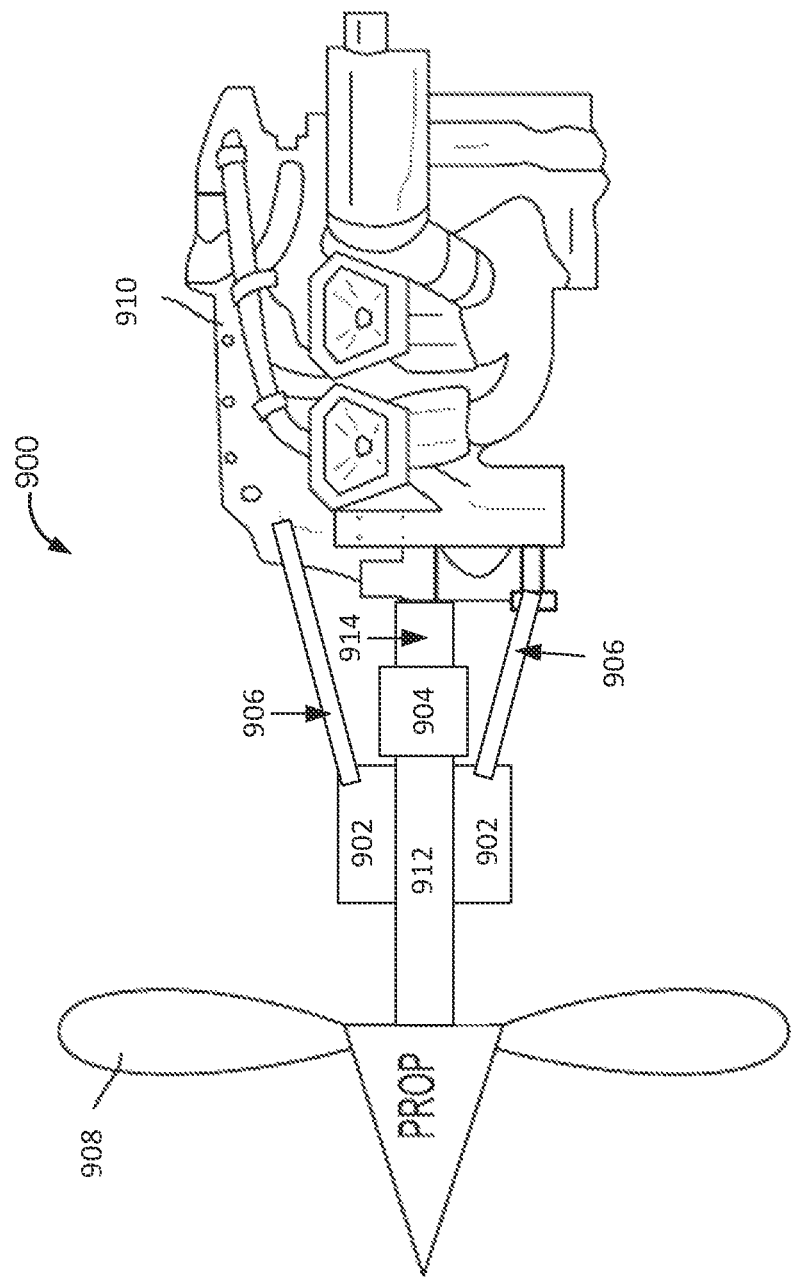
FIG. 9 illustrates a misalignment system.

FIGS. 7-9 illustrate some examples of existing solutions. FIG. 7 illustrates belt, chain, or gearbox hybrid system 700. Engine 710 is coupled to pulley or gear 706 that is coupled to pulley or gear 704 that is coupled to motor 702. Shaft 712 may drive propeller 708. FIG. 8 illustrates bearingless system 800. Engine 810 may be rigidly mounted to stator 822 of motor 802. Motor 802 comprises a stationary stator 822 and a rotating rotor 823. Rotor 823 may also be mounted to shaft 812. Shaft 812 may drive propeller 808. FIG. 9 illustrates misalignment system 900. Engine 910 may be rigidly attached to motor 902 via couplings 906. Misalignment element 904 may accommodate the misalignment between the propeller-motor shaft 912 and the engine shaft 914. Shaft 912 may drive propeller 908. It should be appreciated that while housings are not shown around some of the individual components in FIGS. 7-9, housings may be used to surround one or more components, including, for example, the rotor and the stator of the electric motor.

Aside from the extra components used to try and align the two output shafts, the existing solutions that use rotating crankshafts may also create unwanted vibration issues that require additional systems that add their own weight, package volume, and complexity. There are two main existing solutions to resolve this vibration issue. One existing solution is to rigidly connect the crankshaft from the combustion engine to the power consuming element. Another existing solution is to use a customized gearbox and other components between the engine and the power consuming element to minimize the vibrations.

The presently disclosed technology provides a new solution that is lightweight and reduces the volume of the parallel hybrid propulsion system. In one implementation, the solution described herein reduces the number of additional drive elements and mounting components to a single component: a mechanical link coupling the electric motor to the combustion engine. In some implementations, the mechanical link may be coupled to the stator and the combustion engine. The presently disclosed technology combines an output from a combustion engine and an electric motor with a single power output shaft. The presently disclosed technology further provides a highly efficient solution to minimize losses between the power generation elements and power consuming elements of a parallel hybrid aircraft. The mechanical link also helps reduce vibrations caused by a combustion engine.

In some implementations, the electric motor rotor shaft may be sufficiently stiff and strong to transmit the full combined power of the electric motor and the combustion engine and to support the attached power transmission components. In some implementations, the attached power transmission components may be a drive shaft or a shaft including a propeller. In some implementations, the electric motor rotor shaft may be bolted directly and rigidly to the combustion engine output shaft. The stator element of the electric motor may be supported by rotational shaft bearings within the electric motor. The stator element is thus fixed in space relative to the combustion motor output shaft. To allow the electric motor to input or extract power, the stator element may be restrained against rotation by connecting, for example, the stator element to the combustion engine with a mechanical link that has bearings on each end. One of more of the bearings may include spherical bearings or elastomeric bearings. A link with these bearings may be effective in resisting the torque load while allowing unrestrained motion in all other directions. Such motion in other directions may result from various sources, such as, for example, free play in the bearings of the combustion engine or bending of the engine shaft due to external loading.

Figure 1:
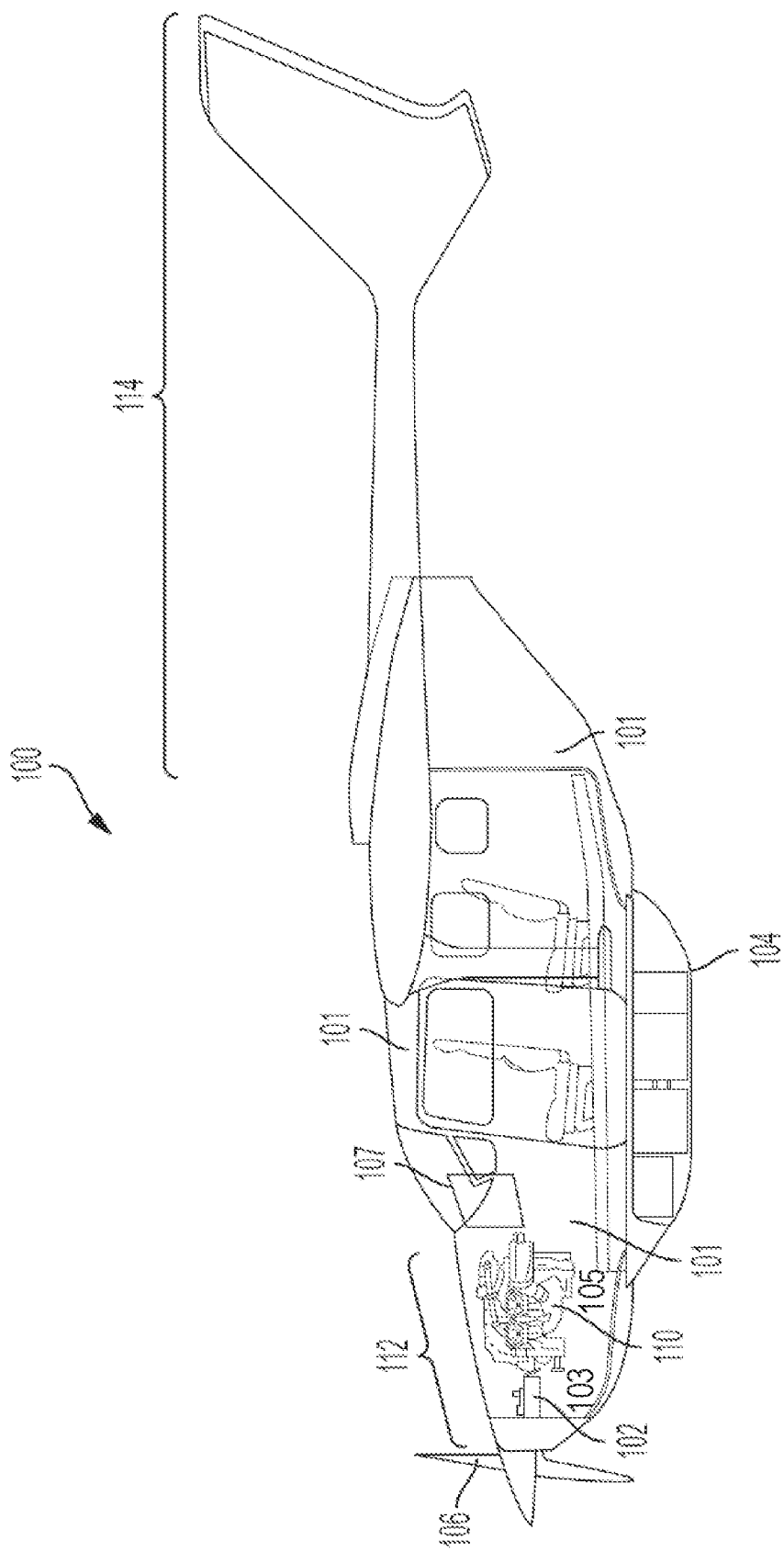
FIG. 1 illustrates a side view of a parallel hybrid aircraft, in accordance with one or more implementations.

FIG. 1 illustrates a side view of a parallel hybrid aircraft 100. Parallel hybrid aircraft 100 may include an electric propulsion system and combustion propulsion system. The electric propulsion system 103 and combustion propulsion system 105 may have a lower weight, a smaller volume, and/or a simpler propulsion system than existing comparable electric and/or hybrid aircraft.

Parallel hybrid aircraft 100 may include one or more of a passenger aircraft, an unpiloted cargo aircraft, a piloted cargo aircraft, a manned aircraft, an unmanned aircraft, and/or other aircraft configured to transport people and/or items via flight, and/or perform other functions via flight. Parallel hybrid aircraft 100 may include a fuselage 101, an electric propulsion system 103, a combustion propulsion system 105, a flight control system 107, and/or other components.

Fuselage 101 may be the body of parallel hybrid aircraft 100. Fuselage 101 may have a variety of shapes, structures, and/or configurations as would be known to those skilled in the art. Electric propulsion system 103 may include one or more motors 102, electric power source 104, one or more inverters (not shown), and/or other components. Each of the one or more motors 102 may include a stator, a rotor, and a rotor shaft. Combustion propulsion system 105 may include a combustion engine 110 and/or other components. Each of the one or more combustion engines 110 may include an engine shaft and/or other components. The combustion engine 110 may include a piston engine, gas engine, turbine engine, diesel engine, and/or other type of propulsion engine. Propeller 106 may be powered by combustion engine 110, one or more motors 102, and/or electric power source 104.

Electric propulsion system 103 and combustion propulsion system 105 may be mechanically coupled together. For example, a given motor's rotor shaft may be coupled to an output shaft of a corresponding combustion engine. In some implementations, the rotor shaft may be directly bolted to the engine shaft. In implementations, the rotor shaft may be a propeller shaft. In some implementations, the rotor shaft may be bolted to the propeller shaft. A given motor's stator may be coupled to the combustion engine to prevent rotation of the stator in a direction and/or degree of freedom. In some implementations, the stator may be coupled to the combustion engine via a mechanical link. The mechanical link may include bearings on each end to allow movement of a given motor and/or given combustion engine in other directions and/or degrees of freedom.

Electric propulsion system 103 and combustion propulsion system 105 may be separately operable. Electric propulsion system 103 and combustion propulsion system 105 can be operated in independently efficient manners and/or optimized independently for flight regimes suited to the unique strengths of each propulsion system. Electric propulsion system 103 and/or combustion propulsion system 105 may include one or more of a compressor, a turbine, diesel engine, a piston engine, a ducted fan, a combustor, a mixer, a propeller, a nozzle, an electric power source, an inverter, and/or other components. Electric propulsion system 103 may include an electric power source. The electric power source may be coupled to parallel hybrid aircraft 100. By way of non-limiting example, the electric power source may include one or more batteries that can be removably coupled to fuselage 101 of parallel hybrid aircraft 100. In some implementations, the electric power source 104 may include, by way of non-limiting examples, super capacitors, fuel cells, and/or other technologies.

In some implementations, parallel hybrid aircraft 100 may include a retrofitted combustion powered aircraft. Parallel hybrid aircraft 100 may be created by retrofitting the combustion powered aircraft including a combustion propulsion system 105 with an electric propulsion system 103. Retrofitting the combustion powered aircraft to create parallel hybrid aircraft 100 may include adapting, augmenting, and/or adding flight control system 107. In some implementations, retrofitting the combustion powered aircraft to create parallel hybrid aircraft 100 may include attaching electric power source 104 to fuselage 101 of parallel hybrid aircraft 100. By way of non-limiting example, electric power source 104 may be removably coupled to the belly (or underside) of the parallel hybrid aircraft 101. Electric power source 104 may be replaced quickly after one flight for another flight.

In some implementations, the presently disclosed technology may simplify the retrofitting process because it may only need to add a single component, aside from the electric propulsion system: a mechanical link coupling the motor's stator to a body of the combustion engine to prevent motion of the stator in a first direction and/or degree of freedom. The existing combustion engine's output shaft may also be coupled to the electric motor's rotor shaft. That is, the combustion engine's output shaft may be retrofit to be coupled to the electric motor's rotor shaft.

Parallel hybrid aircraft 100 may include a flight control system 107. Flight control system 107 may control which of and/or how much an electric propulsion system 103 and/or combustion propulsion system 105 provide propulsion and/or thrust for different portions of a flight. By way of non-limiting example, flight control system 107 may be configured to control the power output of electric propulsion system 103 and/or combustion propulsion system 105 based on the flight and/or flight profile. In some implementations, flight control system 107 may be a mechanical flight control system, a manual flight system, a power actuated system, a digital fly-by-wire system, FADEC integration, and/or other flight control system. In some implementations, the flight control systems may couple the combustion propulsion system and/or the electric propulsion system together to enable dynamic control and/or power balance between the multiple systems (e.g., combustion propulsion system, the electric propulsion system, and/or other systems).

Propeller 106 powered by the one or more motors 102, one or more combustion engines 110, and/or other components may be located at or near the nose 112 of parallel hybrid aircraft 100. Though not all shown, various propeller configurations are contemplated.

Figure 2:
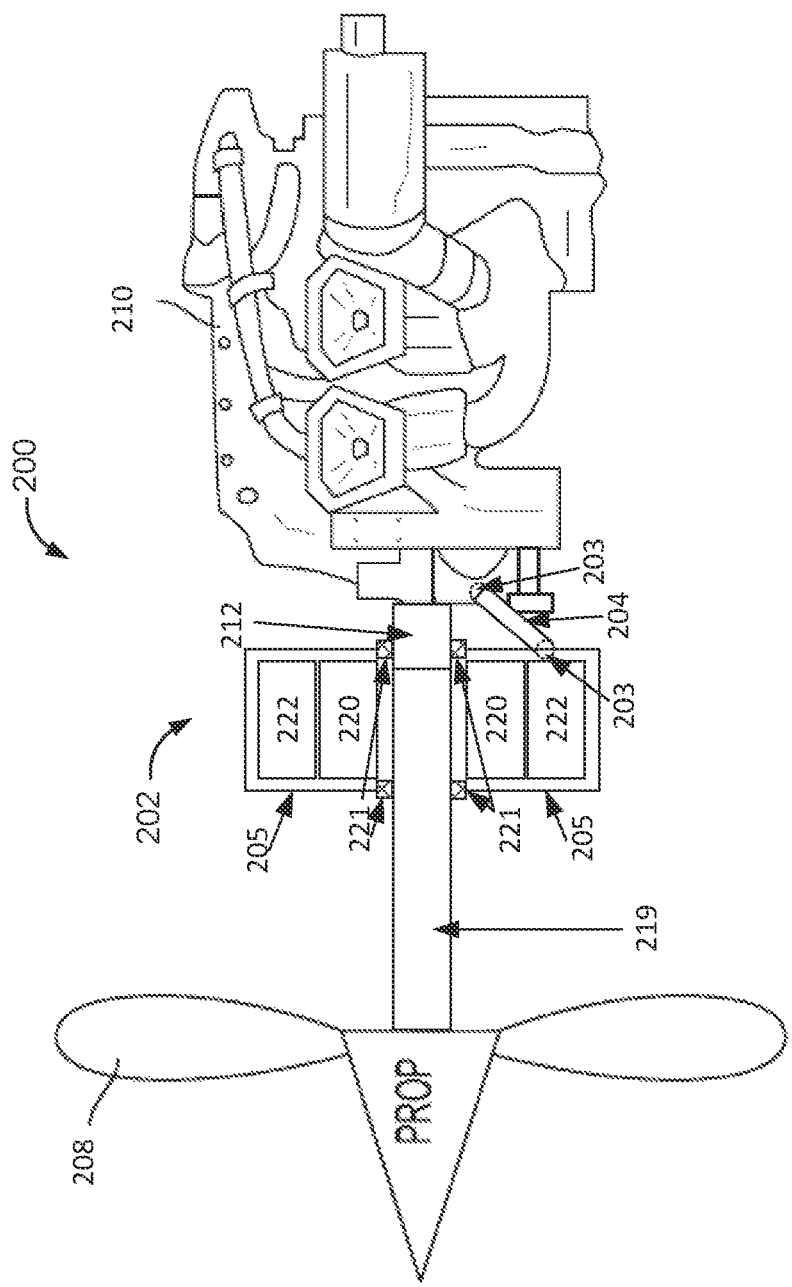
FIG. 2 illustrates a configuration of a parallel hybrid aircraft powertrain, in accordance with one or more implementations.

FIG. 2 illustrates a parallel hybrid aircraft drivetrain, in accordance with one or more implementations. In some implementations, the parallel hybrid aircraft (the same as or similar to parallel hybrid aircraft 100) may include a propeller 208. Propeller 208 may be coupled to a nose of the parallel hybrid aircraft. Propeller 208 may be powered by electric motor 202 and/or the combustion engine 210 via engine shaft 212. As noted above, electric motor 202 may include, stator 222, support bearings 221, rotor 220, propeller-rotor shaft 219, and housing 205. Engine shaft 212 may be coupled to propeller-rotor shaft 219. For example, engine shaft 212 may be rigidly bolted to propeller-rotor shaft 219, and propeller-rotor shaft 219 may drive the propeller. Propeller-rotor shaft 219 may be a rigid material to power propeller 208. In implementations, the propeller-rotor shaft may be a propeller shaft. In some implementations, the propeller-rotor shaft may be bolted to the propeller shaft. In implementations, engine shaft 212 may be coupled to the propeller-rotor shaft 219 using mating flanges at the ends of the shafts (this detail not shown). It should be appreciated there are different ways of coupling engine shaft 212 to propeller-rotor shaft 219 that would be understood by a POSITA. Regardless of how engine shaft 212 and motor shaft 219 may be coupled, it should be appreciated that propeller-rotor shaft 219 drives propeller 208.

With respect to the components of electric motor 202, support bearings 221 may support electric motor 202. Support bearings 221 may be at a front and a back of electric motor 202. In some implementations, this may mean support bearings are outside of stator 220 and rotor 222. Electric motor 202 may be coupled to combustion engine 210 via link 204. It should be appreciated that link 204 may be coupled to another part of electric motor than what is illustrated. For example, link 204 may be coupled to stator 220. In some implementations, stator may be directly or indirectly coupled to housing 205. It should also be appreciated that link 204 may be coupled to a different location of combustion engine 210 than what is illustrated. In some implementations, link 204 may be coupled to electric motor 202 and combustion engine 210 via bearings 203. Bearings 203 may be utilized between link 204 and combustion engine 210 and electric motor 202 by any method commonly known those skilled in the art. For example, there may be bearing housing(s) in one or more of the combustion engine 210, electric motor 202, and link 204. Each of combustion engine 210, electric motor 202, and link 204 may be configured to operate with bearings 203 to couple together via link 204.

Link 204 may be made of a material that is rigid, including for example, steel or other hard metals. Link 204 may be hollow or solid. Link 204 may prevent rotation of the stator. Link 204 may resist the torque load, keeping the stator fixed in space relative to the engine shaft 212, while allowing unrestrained motion in all other directions or degrees of freedom. Such motion in other directions may result from various sources, such as, for example, free play in the bearings of the combustion engine or bending of the engine shaft 212 due to external loading.

In implementations, the output of combustion engine 210 may be a direct drive where engine shaft 212 is the crankshaft or, in some implementations, combustion engine 210 may include a gearbox (not shown) where engine shaft 212 is the output of the gearbox.

Figure 10:
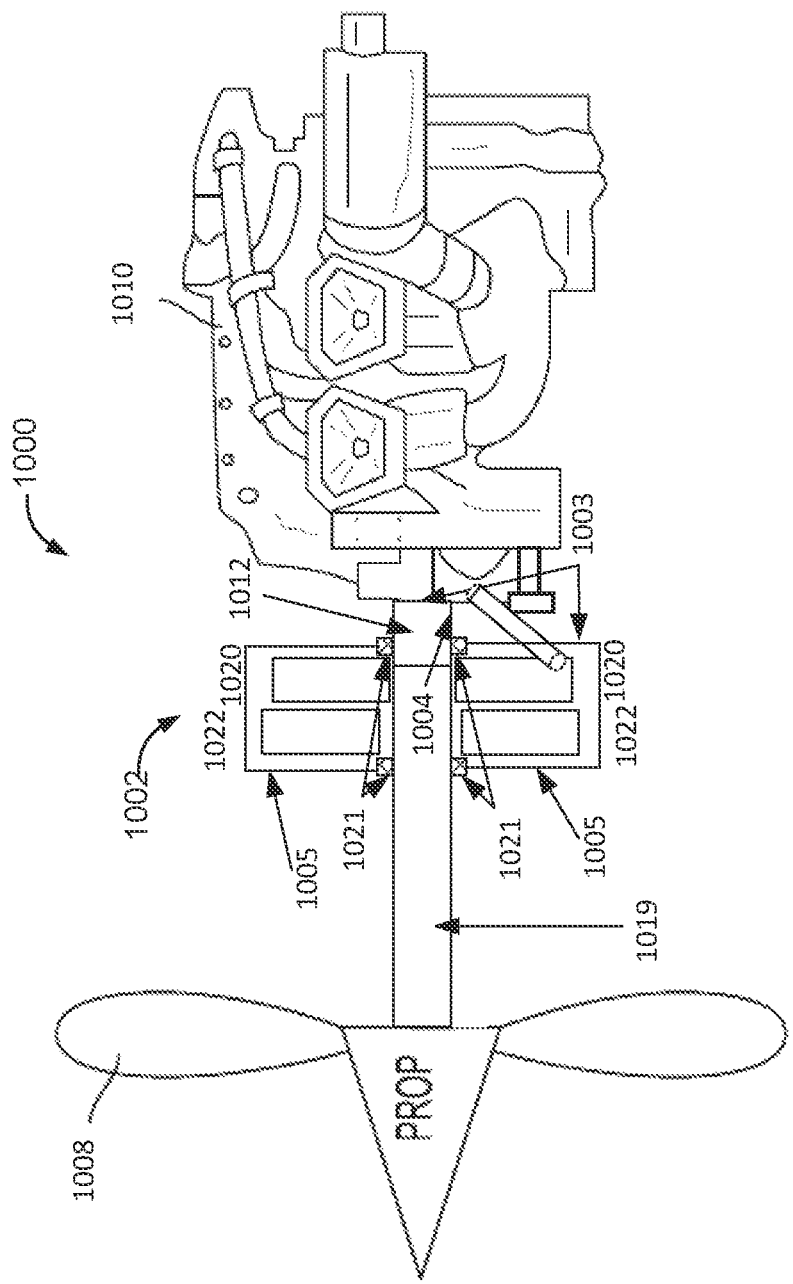
FIG. 10 illustrates a configuration of a parallel hybrid aircraft powertrain, in accordance with one or more implementations.

FIG. 10 illustrates a parallel hybrid aircraft drivetrain, in accordance with one or more implementations. FIG. 10 may be substantially similar to FIG. 1. At least one difference between the parallel hybrid aircraft drive of FIG. 2 and the parallel hybrid aircraft drive of FIG. 10 may be an arrangement, position, and/or type of stator 1022 and rotor 1020. For example, in FIG. 10, stator 1022 and rotor 1020 may be in an axial gap arrangement, and in FIG. 2, stator 222 and rotor 220 may be in a radial gap arrangement.

Figure 3:
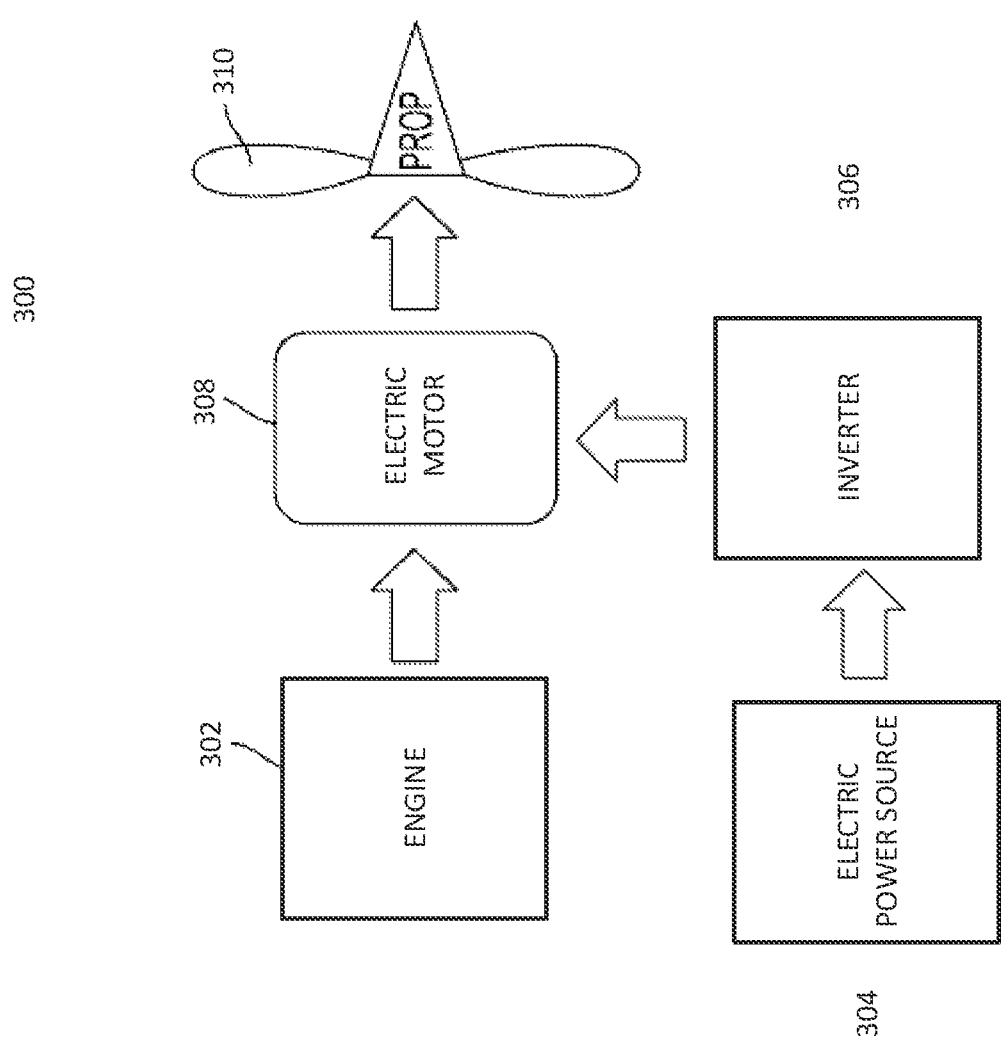
FIG. 3 illustrates a power flow diagram for a parallel hybrid aircraft, in accordance with one or more implementations.

FIG. 3 illustrates a power flow diagram for a parallel hybrid aircraft, in accordance with one or more implementations. Power flow diagram 300 may illustrate engine 302 (e.g., a combustion engine) and electric motor 308 providing power to propeller 310. Electric power source 304, which utilizes inverter 306 and electric motor 308 may provide power to propeller 310. Electric power source 304, inverter 306, and/or electric motor 308 may be independently operable from engine 302.

Figure 4:
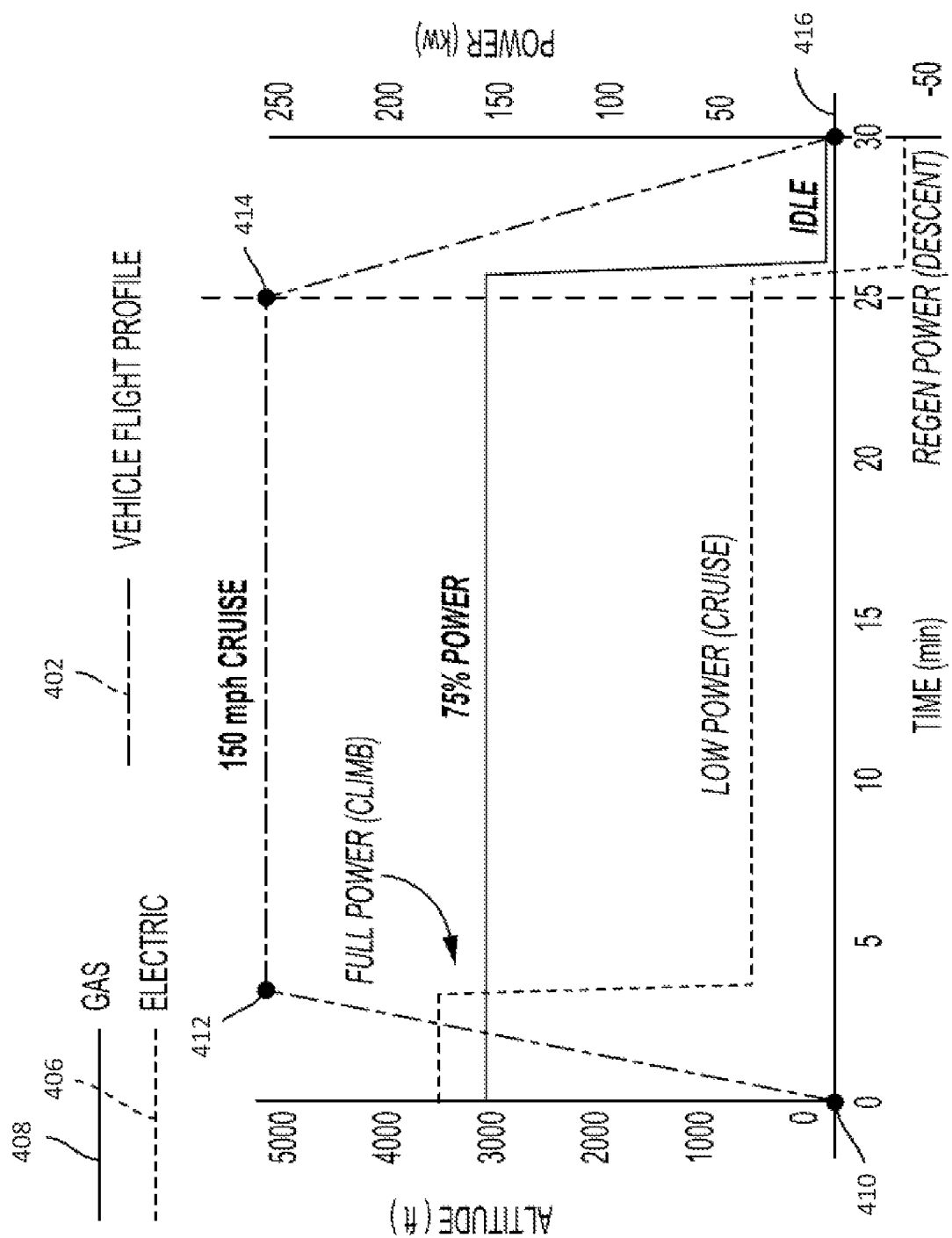
FIG. 4 illustrates a flight profile for a parallel hybrid aircraft, in accordance with one or more implementations.

FIG. 4 illustrates a flight profile for a parallel hybrid aircraft, in accordance with one or more implementations. Flight profile 400 illustrates a flight profile for a parallel hybrid aircraft (e.g., the same as or similar to parallel hybrid aircraft 100). By way of non-limiting example, flight profile 400 may illustrate a flight profile for an example 100 mile flight by a cargo parallel hybrid aircraft.

At takeoff 410, the parallel hybrid aircraft may use both the combustion propulsion system 408 and the electric propulsion system 404. At the cruising altitude 412, the combustion propulsion system 408 may maintain the threshold power level and/or speed. Electric propulsion system 404 may go into a low-power mode while the parallel hybrid aircraft is in forward flight at the cruising altitude 412. At or near the initial descent 414 of the parallel hybrid aircraft, the combustion propulsion system 408 may switch to an idle mode. The electric propulsion system 404 may switch into a regenerative power mode during descent of the parallel hybrid aircraft.

Figure 5:
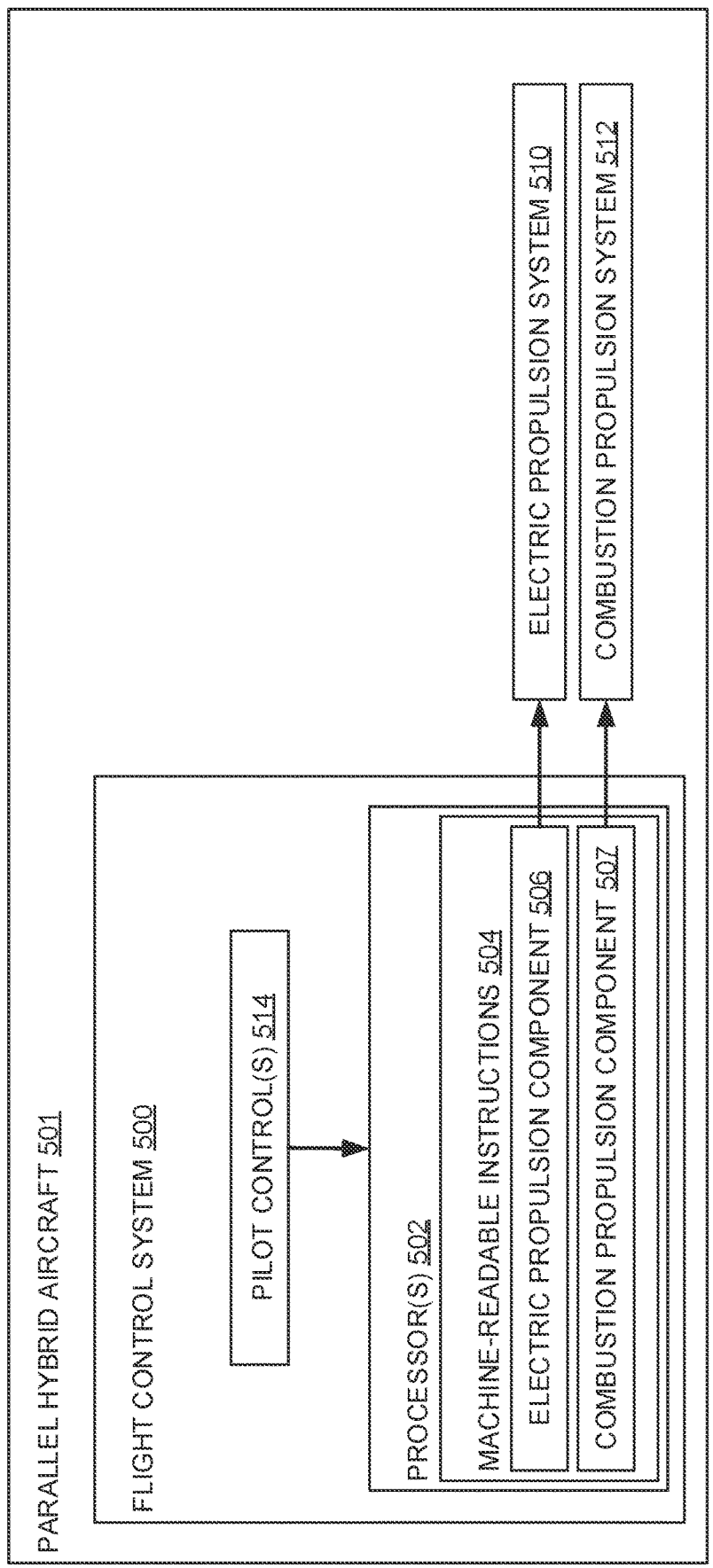
FIG. 5 illustrates a flight control system, in accordance with one or more implementations.

FIG. 5 illustrates a flight control system, in accordance with one or more implementations. Flight control system 500 for parallel hybrid aircraft 501 may include one or more processors 502. One or more processors 502 may be configured by machine-readable instructions 504 to execute one or more components. Electric propulsion component 506 may be configured to control electric propulsion system 510. Combustion propulsion component 507 may be configured to control combustion propulsion system 512. Flight control system 500 may be configured to receive input via one or more pilot controls 514.

Electric propulsion component 506 may be configured to control electric propulsion system 105 to provide propulsion and/or thrust to propel parallel hybrid aircraft 501 during takeoff of parallel hybrid aircraft 501, in order to maintain a low-power mode for at least a portion of the forward flight at the cruising altitude, to supplement the power provided by combustion propulsion system 512, including in low-power mode, to stop providing power (e.g., become idle), and to capture regenerative power during forward flight, descent and/or landing of parallel hybrid aircraft 501.

Combustion propulsion component 507 may be configured to control combustion propulsion system 512 to provide propulsion and/or thrust of the parallel hybrid aircraft 501 to control combustion propulsion system 512 to provide propulsion and/or thrust during takeoff of parallel hybrid aircraft 501, to control combustion propulsion system 512 to provide power during forward flight of parallel hybrid aircraft 501 at the cruising altitude, and to control combustion propulsion system 512 to stop providing power (e.g., become idle).

Figure 6:
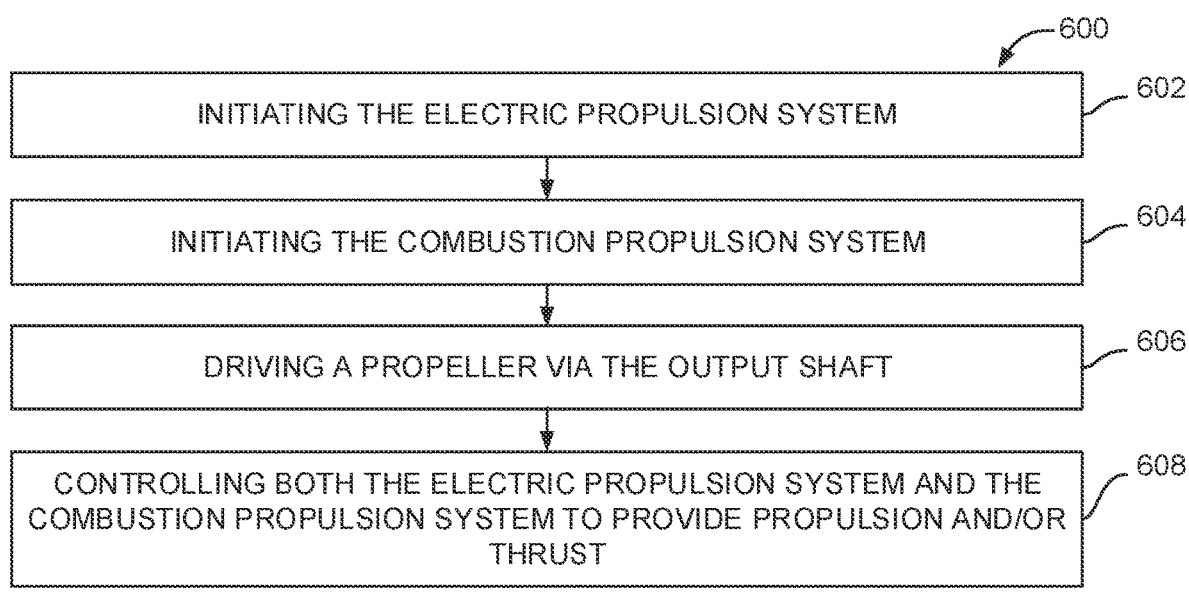
FIG. 6 illustrates a method for flying a parallel hybrid aircraft, in accordance with one or more implementations.

FIG. 6 illustrates a method for flying a parallel hybrid aircraft, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 illustrated in FIG. 6 and described below is not intended to be limiting.

In some implementations, method 600 may be implemented by one or more components of a parallel hybrid aircraft including a fuselage, one or more wing(s), a nose portion, a tail portion, an electric propulsion system, a combustion propulsion system, a flight control system, and/or other components.

At an operation 602, the electric propulsion system may be initiated. After being initiated, the electric propulsion system may provide propulsion and/or thrust to propel the parallel hybrid aircraft for ground movement (e.g., taxiing, etc.), takeoff, forward flight at cruising altitude, and/or landing. The electric propulsion system may be independently operable from the combustion propulsion system. The electric propulsion system may include one or more motors, one or more inverters, and an electric power source. A given motor may include a stator, a rotor, and a rotor shaft. In some implementations, operation 602 may be performed by a flight control system the same as or similar to flight control system 107 and/or flight control system 500 (shown in FIGS. 1 and 5 and described herein).

At an operation 604, the combustion propulsion system may be initiated. After being initiated, the combustion propulsion system alone may provide propulsion and/or thrust to propel the parallel hybrid aircraft or the combustion propulsion system in combination with the electric propulsion system may provide propulsion and/or thrust to propel the parallel hybrid aircraft. The combustion propulsion system may be independently operable from the combustion propulsion system. The combustion propulsion system may include one or more combustion engines. A given combustion engine may include an engine shaft. The engine shaft may transmit power from the combustion engine. In some implementations, operation 604 may be performed by a flight control system the same as or similar to flight control system 107 and/or flight control system 500 (shown in FIGS. 1 and 5 and described herein).

At an operation 606, a propeller may be driven via the engine shaft. The engine shaft may be coupled to the rotor shaft. In some implementations, the rotor shaft may be the propeller shaft. In implementations, the rotor shaft may be bolted to the propeller shaft. The stator may be coupled to the combustion engine via a mechanical link. The motor may be between the propeller and the combustion engine. The combustion propulsion system may be independently operable from the electric propulsion system. In some implementations, operation 606 may be performed by a flight control system the same as or similar to flight control system 107 and/or flight control system 500 (shown in FIGS. 1 and 5 and described herein).

At an operation 608, both the electric propulsion system and the combustion propulsion system may be controlled to provide propulsion and/or thrust. Both the electric propulsion system and the combustion propulsion system may be independent controlled and/or operated to provide propulsion and/or thrust during ground movement (e.g., taxiing, etc.), takeoff, forward flight at cruising altitude, and/or landing. In some implementations, operation 608 may be performed by a flight control system the same as or similar to flight control system 107 and/or flight control system 500 (shown in FIGS. 1 and 5 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A parallel hybrid propulsion system for an aircraft, the parallel hybrid propulsion system comprising:
    a combustion engine;
    an electric motor, wherein the electric motor comprises a stator and a rotor;
    a power consuming element;
    at least one shaft coupled to the combustion engine, the rotor, and the power consuming element; and
    a mechanical link coupled to the stator and the combustion engine, wherein the mechanical link substantially prevents rotation of the stator with respect to the combustion engine, and wherein the mechanical link allows movement of the stator relative to the combustion engine in degrees of freedom other than the rotation of the stator with respect to the combustion engine.

2. The parallel hybrid propulsion system of claim 1, wherein the mechanical link is at an angle of less than 30 degrees with respect to an axis of the at least one shaft.

3. The parallel hybrid propulsion system of claim 1, wherein:
    the at least one shaft comprises an engine shaft; and
    the combustion engine comprises a gearbox, wherein the gearbox comprises the engine shaft.

4. The parallel hybrid propulsion system of claim 1, further comprising:
    a combustion propulsion system including the combustion engine; and
    an electric propulsion system including the electric motor.

5. The parallel hybrid propulsion system of claim 4, further comprising a flight control system that controls which of the electric propulsion system and/or the combustion propulsion system provides propulsion and/or thrust, wherein the flight control system is configured to:
    control the electric propulsion system to provide propulsion and/or thrust to propel the parallel hybrid aircraft while the combustion propulsion system is idle;
    control both the electric propulsion system and the combustion propulsion system to provide propulsion and/or thrust; and
    control the combustion propulsion system to provide propulsion and/or thrust.

6. The parallel hybrid propulsion system of claim 5, wherein the combustion propulsion system includes a compressor, a turbine, a diesel engine, a piston engine, a ducted fan, a combustor, a mixer, and/or a nozzle.

7. The parallel hybrid propulsion system of claim 1, further comprising:
    an electric power source configured to power the electric motor.

8. The parallel hybrid propulsion system of claim 1, wherein the power consuming element comprises a propeller.

9. The parallel hybrid propulsion system of claim 8, wherein the rotor is coupled to the at least one shaft between the propeller and the combustion engine.

10. The parallel hybrid propulsion system of claim 1, wherein the mechanical link is coupled to each of the stator and the combustion engine via a spherical bearing.

11. The parallel hybrid propulsion system of claim 1, wherein the mechanical link is coupled to each of the stator and the combustion engine via an elastomeric bearing.

12. The parallel hybrid propulsion system of claim 1, further comprising:
    support bearings between the rotor and the stator.

13. A method for controlling flight via a parallel hybrid aircraft having an electric propulsion system and a combustion propulsion system, the method comprising:
    initiating the electric propulsion system, which is independently operable from the combustion propulsion system and which includes an electric motor and an electric power source, wherein the electric motor comprises a stator and a rotor;

initiating the combustion propulsion system, which is independently operable from the electric propulsion system and which includes a combustion engine; and controlling both the electric propulsion system and the combustion propulsion system to provide propulsion and/or thrust to a power consuming element via at least one shaft;

wherein a mechanical link is coupled to the stator and the combustion engine, wherein the mechanical link substantially prevents rotation of the stator with respect to the combustion engine, and wherein the mechanical link allows movement of the stator relative to the combustion engine in degrees of freedom other than the rotation of the stator with respect to the combustion engine.

14. The method of claim 13, wherein the power consuming element comprises a propeller.

15. The method of claim 14, wherein the rotor is coupled to the at least one shaft between the propeller and the combustion engine.

16. The method of claim 13, wherein the mechanical link is at an angle of less than 30 degrees with respect to the at least one shaft.

17. The method of claim 13, wherein:
the at least one shaft comprises an engine shaft; and
the combustion engine comprises a gear box, wherein the gearbox comprises the engine shaft.

18. The method of claim 13, wherein the combustion propulsion system includes a compressor, a turbine, a diesel engine, a piston engine, a ducted fan, a combustor, a mixer, and/or a nozzle.

19. The method of claim 13, wherein the mechanical link is coupled to each of the stator and the combustion engine via an elastomeric bearing.

20. The method of claim 13, wherein the mechanical link is coupled to each of the stator and the combustion engine via a spherical bearing.

* * * * *